(12) United States Patent
Okada

(10) Patent No.: US 6,871,001 B1
(45) Date of Patent: Mar. 22, 2005

(54) VIDEO DECODER

(75) Inventor: Shigeyuki Okada, Ogaki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/700,575

(22) PCT Filed: Mar. 21, 2000

(86) PCT No.: PCT/JP00/01725
§ 371 (c)(1),
(2), (4) Date: Nov. 16, 2000

(87) PCT Pub. No.: WO00/57650
PCT Pub. Date: Sep. 28, 2000

(30) Foreign Application Priority Data

Mar. 23, 1999 (JP) .......................... 11-078207

(51) Int. Cl.[7] .............................................. H04N 9/79
(52) U.S. Cl. .............................. 386/6; 386/44; 386/111
(58) Field of Search ............................... 386/1, 6, 7, 44, 386/46, 68, 111, 112

(56) References Cited

U.S. PATENT DOCUMENTS 5,412,428 A * 5/1995 Tahara .................... 375/240.25
6,571,050 B1 * 5/2003 Park ............................ 386/46
6,735,340 B1 * 5/2004 Ohno ........................ 382/238

FOREIGN PATENT DOCUMENTS

| EP | 0 602 642 A2 | 6/1994 |
| JP | 6-189298 | 7/1994 |
| JP | 7-298264 | 11/1995 |
| JP | 8-186826 | 7/1996 |
| JP | 11-55668 | 2/1999 |

OTHER PUBLICATIONS

ISO/IEC 11172–1; First edition Jan. 8, 1993; Information technology –coding of moving pictures and associated audio for digital storage media at up to about 1,5 Mbit/s—; Part 1: Systems.
ISO/IEC 11172–2; First edition Jan. 8, 1993; Information technology –coding of moving pictures and associated audio for digital storage media at up to about 1,5 Mbit/s–; Part 2: Video.
ISO/IEC 11172–3; First edition Jan. 8, 1993; Information technology –coding of moving pictures and associated audio for digital storage media at up to about 1,5 Mbit/s–; Part 3: Audio.

* cited by examiner

Primary Examiner—Huy Nguyen
(74) Attorney, Agent, or Firm—Westerman, Hattori, Daniels & Adrian, LLP (57) ABSTRACT

An MPEG video decoder 1 decodes a MPEG video stream using a discrete cosine transform together with a motion compensated prediction performing backward prediction and forward prediction. A frame buffer 104a is provided with a storage area for forward-reference luminance data used for the backward prediction and a storage area for rearward-reference color-difference data used for the forward prediction. A frame buffer 104b is provided with a storage area for forward-reference color-difference data used for the backward prediction and a storage area for rearward-reference luminance data used for the forward prediction. Memory access for each of the frame buffers 104a, 104b with an input/output data bus width of 16 bit is performed in a parallel processing.

11 Claims, 5 Drawing Sheets

VIDEO DECODER

TECHNICAL FIELD

The present invention relates to a video decoder with an image compression system in accordance with, for example, the MPEG standard,

BACKGROUND ART

Multimedia applications handle enormous and various information, and it has been necessary to rapidly process such information for the practical multimedia applications. A data compression/decompression technology is indispensable for rapidly processing the information.

One example of such a data compression/decompression technology is an "MPEG (Moving Picture Expert Group)" system. The MPEG system is standardized by an MPEG committee (ISO/IEC JTC1/SC29/WG11) affiliated with ISO (International Organization for Standardization)/IEC (International Electro-technical Commission).

The MPEG consists of three sections. Part 1, "MPEG systems part," (ISO/IEC IS 11172 Part 1:Systems) defines multiplex structures and synchronous systems of video data and audio data. Part 2, "MPEG video part" (ISO/IEC IS 11172 Part 2:Video) defines a high efficiency coding system and a format of video data. Part 3, "MPEG audio part" (ISO/IEC IS 11172 Part 3:Audio) defines high efficiency coding system and a format of audio data.

The video data handled in the MPEG video part involves a moving image, which is constituted by dozens of (e.g., 30) frames (static images, segments) per second. The video data is constituted of a six-layer hierarchical structure, which includes a Sequence, a GOP (Group Of Pictures), a Picture, a Slice, a Macroblock and a Block. The number of Slices forming one Picture may vary, and the number of Macroblocks forming a Slice may also vary.

Further, the MPEG standard defines two systems, MPEG-1 and MPEG-2, mainly depending on a difference in encoding rates. In MPEG-1, a frame corresponds to a Picture. In MPEG-2, a frame or a field may correspond to a Picture. One frame includes two fields.

It is noted that a structure in which the frame corresponds to a Picture is referred to as a frame structure, whereas a structure in which the field corresponds to a Picture is referred to as a field structure.

The MPEG uses a compression technology called an interframe prediction. In the interframe prediction, data is compressed based on a time correlation between frames. A bidirectional prediction is performed in the interframe prediction. The bidirectional prediction is a prediction that uses a forward prediction predicting a present reconstructed image from a past reconstructed image (or Picture), together with a backward prediction predicting a present reconstructed image from a future reconstructed image.

The bidirectional prediction defines three types of Pictures referred to as an I-Picture (Intra-Picture), P-Picture (Predictive-Picture) and B-Picture (Bidirectionally predictive Picture).

The I-Picture is generated independent of the past or future reconstructed image. For performing a random access, at least one I-Picture is required in the GOP. All Macroblock Type within I-Picture are IntraFrame prediction images.

P-Picture is generated by the forward prediction (the prediction from a past I-Picture or P-Picture). A Macroblock Type within P-Picture includes both IntraFrame prediction image and Forward Inter Frame prediction image.

B-Picture is generated by the bidirectional prediction. In the bidirectional prediction, B-Picture is generated by any one of the three predictions below.

Forward prediction; a prediction from a past I-Picture or B-Picture

Backward prediction; a prediction from a future I-Picture or P-Picture

Bidirectional prediction; a prediction from past and future I-Picture or P-Picture The Macroblock within B-Picture includes four types, that is, Intraframe prediction image, Forward Inter Frame prediction image, Backward Inter Frame prediction image, and Interpolative Inter Frame prediction image.

These I, P and B Pictures are respectively encoded. That is, an I-Picture is generated without a past or future Picture. On the other hand, a P-Picture is generated only when there is a past Picture, and a B-Picture is generated only when there is a future Picture.

However, when the Mactoblock Type is Interpolative Inter Frame, Mactoblocks of P-Picture and B-Picture could be generated even if there is no past or future Picture.

In Inter Frame prediction, initially, an I-Picture is periodically generated. Subsequently, a frame that is some frames ahead of the I-Picture is generated as a P-Picture. This P-Picture is generated by a prediction in one-way (in the forward direction) from past to present. Thereafter, a frame located before the I-Picture and after the P-Picture is generated as a B-Picture. When the B-Picture is generated, a best prediction method is selected from the three predictions, the forward prediction, the backward prediction and the bidirectional prediction. Generally, in a continuous moving image, a present image is similar to preceding/succeeding images, except for only a part. It is assumed that a frame (e.g., I-Picture) and the succeeding frame (e.g., P-Picture) are almost the same, and if there is a difference between these frames, only the difference (data of B-Picture) is extracted for compression. This allows the compression to be performed in accordance with time correlation of data between the frames.

A data stream (bit stream) of video data encoded based on the MPEG video part, as described above, is referred to as an MPEG video stream (herein after referred to as a video stream).

It is noted that MPEG-1 mainly corresponds to storage media such as a video CD (Compact Disc) and a CD-ROM (CD-Read Only Memory). MPEG-2 corresponds, not only to the storage media such as a video CD, a CD-ROM, a DVD (Digital Video Disc), a video tape and a memory card using a nonvolatile semiconductor memory, but also to all transmission media including communication media such as LAN (Local Area Network) and broadcasting media such as terrestrial broadcasting, satellite broadcasting and CATV (Community Antenna Television).

Motion Compensated prediction (MC) and Discrete Cosine Transform ((DCT) are core technologies used in the MPEG video part. A coding technology using both MC and DCT are referred to as a hybrid coding technology. ADCT code is used in the MPEG video part at the time of encoding, to decompose an image (a video signal) into frequency components for processing. Inverse DCT (IDCT) is used at the time of decoding to restore the frequency components to an image.

Figure 4:
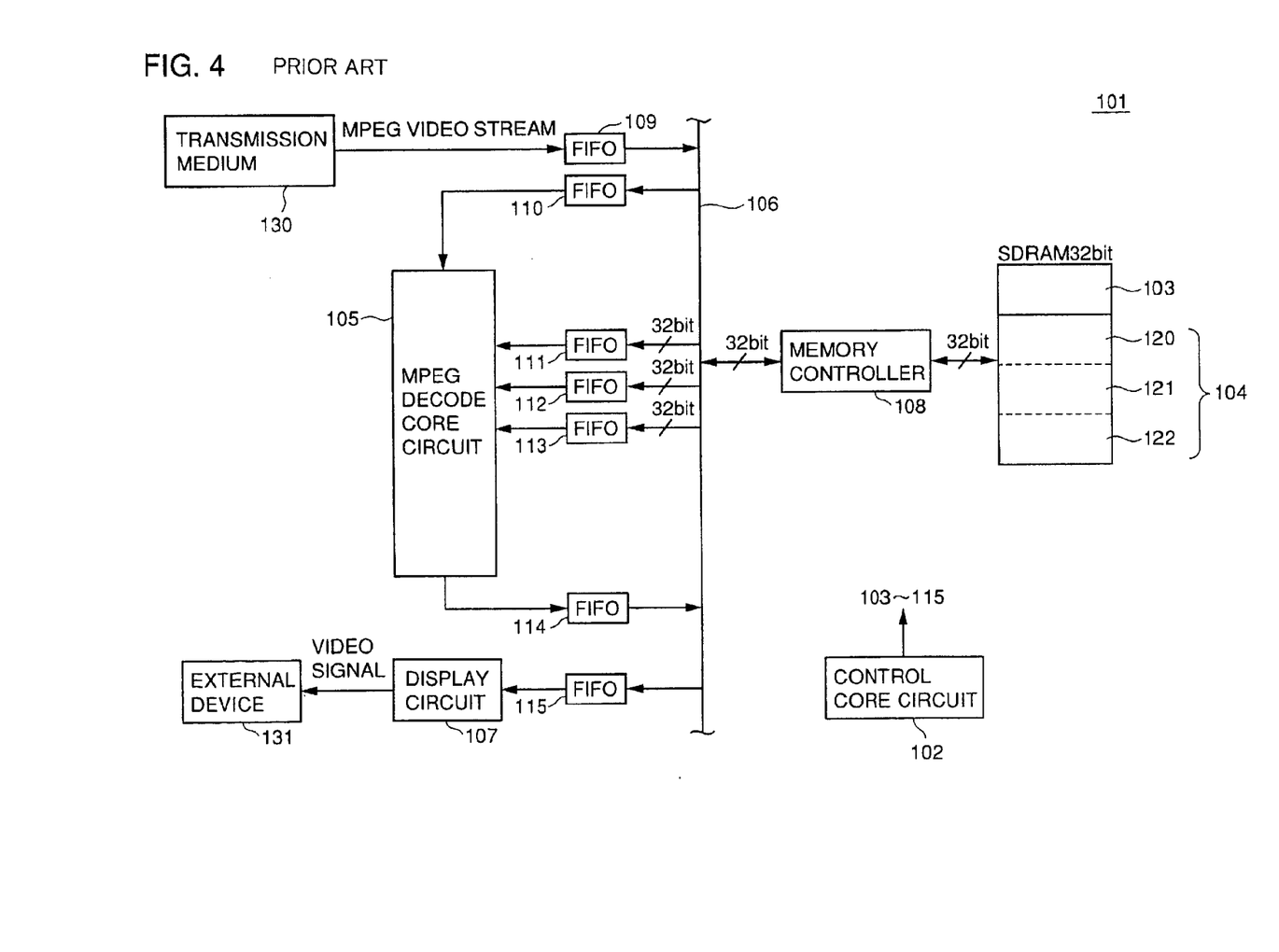
FIG. 4 is a block circuit diagram of a conventional MPEG video decoder.

FIG. 4 is a block circuit diagram of a conventional MPEG video decoder 101.

MPEG video decoder 101 includes a control core circuit 102, a bit buffer 103, a frame buffer 104, an MPEG decode core circuit 105, a data bus 106, a display circuit 107, a memory controller 108 and buffers 109–115 with FIFO (First-In-First-Out) configurations. Circuits 102–115 constituting MPEG video decoder 101 are mounted on one LSI chip.

Control core circuit 102 controls circuits 103–115.

A video stream transferred from a transmission medium 130 is initially input to buffer 109, transferred therefrom in the order of data bus 106, memory controller 108 and to bit buffer 103, and written into bit buffer 103. Transmission medium 130 includes a storage medium (i.e., a video CD, a CD-ROM, a DVD, a video tape, a memory card or the like), a communication medium (LAN or the like), and a broadcasting medium (terrestrial broadcasting, satellite broadcasting, CATV or the like).

Bit buffer 103 is constituted of a ring buffer including a SDRAM (Synchronous Dynamic Random Access Memory) with FIFO configuration, and successively stores video streams transmitted from transmission medium 130.

Bit buffer 103 is provided because each of the I-Picture, the P-Picture and the B-Picture has a different data size. The data size of the I-Picture is approximately 30 kilo byte, the data size of the P-Picture is approximately 10–15 kilo byte, and the data size of the B-Picture is approximately 0–6 kilo byte. However, bit rate of the video stream transmitted from transmission medium 130 is constant. MPEG decode core circuit 105 performs a process for each Picture, and the process time is different depending on the data size of each Picture. This causes a problem that some Pictures may not be processed in MPEG decode core 105 if the video stream transmitted from transmission medium 130 is directly transferred to MPEG decode core circuit 105. To prevent such a problem, bit buffer 103 is provided as a buffer memory for the video stream transferred from transmission medium 130, absorbing a difference between data sizes of I-, P- and B-Pictures.

Frame buffer 104 includes an SDRAM, and its inside is divided into three regions (i.e., a forward reference area 120, a rearward reference area 121 and a B-Picture storage area 122).

It is noted that bit buffer 103 and frame buffer 104 are provided in different regions in one SDRAM, in order to reduce the number and cost of components in MPEG video decoder 101.

Input/output data bus width (bit width) of the SDAM, in which bit buffer 103 and frame buffer 104 are provided, is set to 32 bit. Thus, input/output data bus width of memory controller 108 and data bus width of data bus 106 are also set to 32 bit.

Memory controller 108 controls reading and writing operations of bit buffer 103 and frame buffer 104.

The video stream stored in bit buffer 103 is read, by memory controller 108, for each Picture per one frame period, and the read video stream is transferred from memory controller 108 through data bus 106 and buffer 110 in this order, and input into MPEG decode core circuit 105.

For the video stream of one Picture that has been input, MPEG decode core circuit 105 first performs a variable length decoding process based on the Huffman code. Next, a dequantization process based on a quantization threshold is performed for the result of the variable length decoding process, to obtain a DCT (Discrete Cosine Transform) coefficient. Thereafter, the obtained DCT coefficient is subjected to an IDCT process, and finally an MC (Motion Compensated prediction) process is performed for the result of IDCT (Inverse DCT) process.

The result of the MC process by MPEG decode core circuit 105 is transferred through buffer 114, data bus 106, memory controller 108 and to frame buffer 104 in this order, and stored in any of the areas 120–122 of frame buffer 104 by memory controller 108.

Further, the data read from each of the areas 120–122 of frame buffer 104 by memory controller 108 is transferred in the order from memory controller 108, data bus 106 and to any one of the buffers 111–113, and is input into MPEG decode core circuit 105. Here, the data read from forward reference area 120 is transferred via buffer 111, the data read from rearward reference area 121 is transferred via buffer 112, and the data read from B-Picture storage area 122 is transferred via buffer 113.

A future I-Picture or P-Picture, used when a backward prediction is performed in the MC process by MPEG decode core circuit 105, is stored in forward reference area 120. A past I-Picture or P-Picture, used when a forward prediction is performed in the MC process, is stored in rearward reference area 121. A B-Picture is stored in B-Picture storage area 122.

I-Picture or P-Picture stored in forward reference area 120 and rearward reference area 121 are used as base data for performing the forward or backward prediction, so that they must be kept stored in the areas 120 and 121. B-Picture stored in B-Picture storage area 122 is not handled as base data, and hence the B-Picture will be unnecessary once it is output to the outside of MPEG video decoder 101. It is noted that areas 120–122 are also referred to as planes.

The Picture data read by memory controller 108 from any one of areas 120–122 of frame buffer 104 is transferred from memory controller 108 through data bus 106 and buffer 115 in this order, and is input into display circuit 107.

Display circuit 107 generates a video signal (an image signal) from the data of the Picture, and outputs the video signal to an external device 131 connected to MPEG video decoder 101. For example, if a display is connected as external device 131, the display displays the video signal as an image. If a storage medium (a video tape, a memory card and so forth) is connected as external device 131, the video signal is stored in the storage medium.

MPEG video decoder 101 configured as described above is incorporated into a movie camera, a still camera, a television, a video CD reproducing device, a DVD reproducing device and so forth. When MPEG video decoder 101 is incorporated into a movie camera or a still camera, transmission medium 130 is replaced by an image pick-up device, such as a CCD (Charge Coupled Device), and the signal processing circuit therefor.

Figure 5:
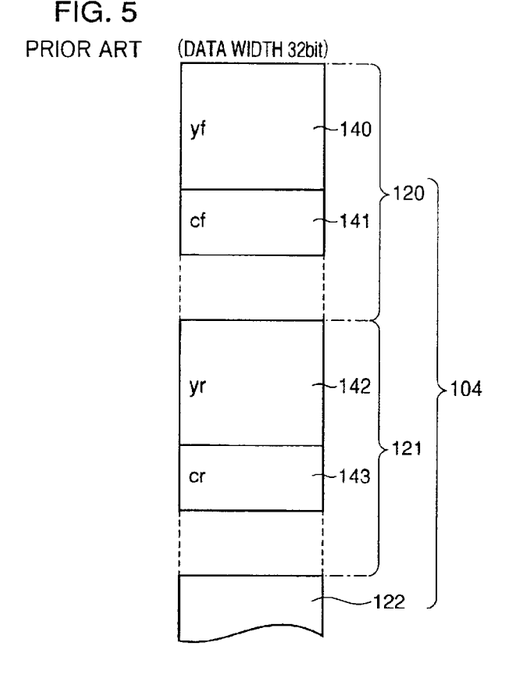
FIG. 5 is a first schematic diagram illustrating an operation of a conventional MPEG video decoder.

FIG. 5 schematically shows a storing state of luminance (Y) data and color difference (C) data stored in forward reference area 120 and rearward reference area 121 of frame buffer 104 including an SDRAM.

Forward reference region 120A is provided with storage area 140 for forward-reference luminance data yf and a storage area 141 for forward-reference color-difference data cf. Further, rearward reference area 121 is provided with a storage area 142 for rearward-reference luminance data yr and a storage area 143 for rearward-reference color-difference data cr.

The data size of the color-difference data is approximately half the data size of the luminance data. The data size of each storage area 141, 143 are set to approximately half the data size of each storage area 140, 142.

It is noted that provision of storage areas 140–143 in areas 120 and 121 of frame buffer 104, for respectively storing data yf, cf, yr and cr therein as described above, is referred to as "memory mapping."

Generally, upon accessing the SDRAM, it is required to set a predetermined command that is determined by a cast sequence and a burst range defined by the SDRAM. Such setting of the predetermined command is referred to as "command overhead." Thus, in a period from a time point at which an access starts to a time point at which actual data writing or reading starts, delay time for a time period required for the command overhead occurs. It is impossible to make this time period required for the command overhead (delay time) equal to or shorter than 6 to 7 operation clocks of the SDRAM.

Figure 6:
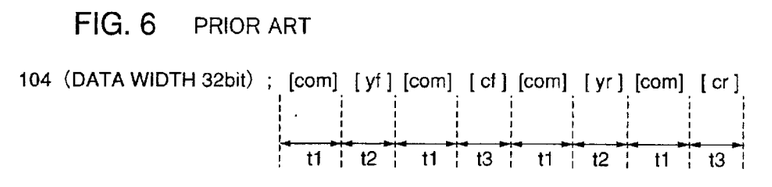
FIG. 6 is a second schematic diagram illustrating an operation of a conventional MPEG video decoder.

FIG. 6 schematically shows the order of the memory access in a case where data for one Macroblock is read from areas 120 and 121 of frame buffer 104 including an SDRAM with an input/output data bus width of 32 bit.

The memory access is performed in the order as follows: command overhead corn for storage area 140; reading of forward-reference luminance data yf from storage area 140; command overhead com for storage area 141; reading of forward-reference color-difference data cf from storage area 141; command overhead corn for storage area 142; reading of rearward-reference luminance data yr from storage area 142; command overhead corn for storage area 143; and reading of rearward-reference color-difference data cr from storage area 143.

Therefore, time period Ti required for the memory access in such a case can be obtained by the equation (1) below.

$$T1 = 4 \times t1 + 2 \times t2 + 2 \times t3 \quad (1),$$ wherein t1 is a time period required for command overhead com, t2 is a time period required for reading of luminance data yf, yr, and t3 is a time period required for reading of color difference data cf, cr.

In the MC process by MPEG decode core circuit 105, for restoring luminance data for half the one Macroblock (half-Macroblock), the luminance data for half-Macroblock may be read from forward reference area 120 or rearward reference area 121.

Figure 7A:
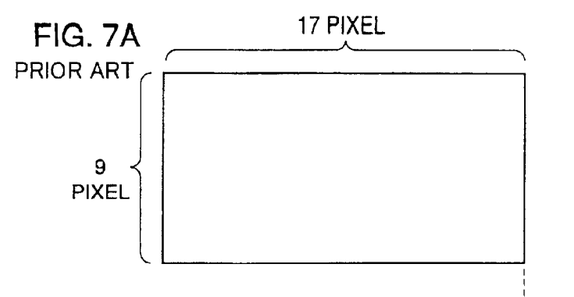
FIG. 7A shows data required for restoring luminance data of a half-Macroblock.

As shown in FIG. 7, the luminance data that must be read from forward reference area 120 or rearward reference area 121 to restore the luminance data for the half-Macroblock is data of 9 pixels (picture element)×17 pixels (picture element).

Generally, a minimum unit that can access the SDRAM will be equal to the value of the burst range defined by the SDRAM multiplied by the input/output data bus width.

Because the minimum value of the burst range is "2," the minimum unit for accessing the SDRAM having the input/output data bus width of 32 bit will be 2×32 bit. It is noted that data size of one pixel picture element) is 8 bit. Therefore, the minimum unit for accessing the SDRAM with the input/output data bus width of 32 bit will be horizontally arranged 8 pixels.

Figure 7B:
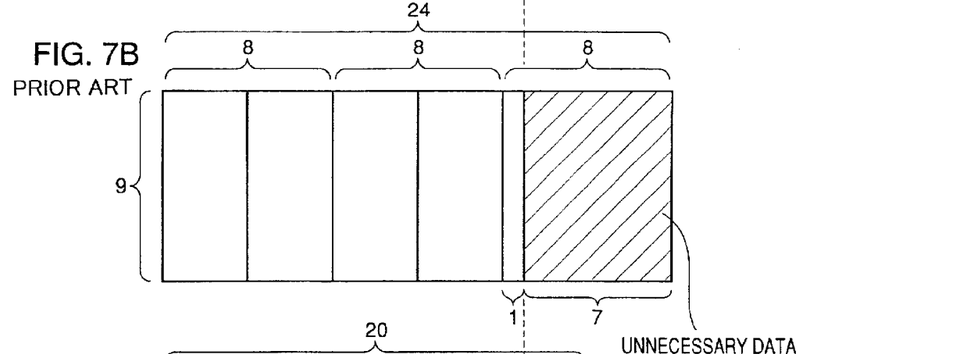
FIG. 7B shows data read upon reading luminance data of the half-Macroblock from frame buffer 104.

Thus, as shown in FIG. 7B, it is necessary to read 9 pixels×24 pixels of data in order to read the luminance data of the half-Macroblock (9 pixels×17 pixels of data) from frame buffer 104 including the SDRAM with the input/output data bus width of 32 bit. Thus, data of 24 pixels, i.e., three times the horizontal 8 pixels, must be read in order to read data of horizontal 17 pixels, since the minimum unit for accessing the SDRAM with the input/output data bus width of 32 bit is horizontal 8 pixels. Except for the necessary data of 9 pixels×17 pixels of the read data of 9 pixels×24 pixels, the remaining data of 9 pixels×7 pixels will be unnecessary.

In recent years, faster operation speed of MPEG video decoder 101 is required. For increasing the operation speed, there are a method of speeding up frame buffer 104 and data bus 106 to increase the operation frequency, and a method of further expanding the input/output data bus width (bit width) to be wider than 32 bit (e.g., 48 bit, 64 bit, 128 bit and so forth). However, frame buffer 104 with high operation frequency will have an increased power consumption, in addition to being expensive. (For example, Rambus DRAM faster than the SDRAM will be more expensive than the SDRAM.) Further expansion of input/output data bus width increases the number of terminals in an LSI as well as the number of chips in the SDRAM included in frame buffer 104, causing increase of a substrate mounting area of MPEG video decoder 101 and higher cost. Thus, it has been required to increase the operation speed of MPEG video decoder 101 without making the operation frequency of frame buffer 104 higher or expanding the input/output data bus width.

DISCLOSURE OF INVENTION

It is an object of the present invention to provide a video decoder using an image compression system, such as the MPEG standard, which enables increase of an operation speed.

To achieve such an object, according to an aspect of the present invention, a video decoder, decoding a video stream using a discrete cosine transform together with a motion compensated prediction performing a backward prediction and a forward prediction, includes a first frame buffer provided with a storage area for forward-reference luminance data used in the backward prediction and a storage area for rearward-reference color-difference data used in the forward prediction; a second frame buffer provided with a storage area for forward-reference color-difference data used in the forward prediction and a storage area for rearward-reference luminance data used in the forward prediction; and a read control circuit performing at least a part of a memory access operation for the first frame buffer and a memory access operation for the second frame buffer in a parallel processing.

Thus, in the present invention, if the first and second frame buffers with a small input/output data bus width are used, reading of unnecessary data can be reduced even when luminance data of a half-Macroblock (for example, data of 9 pixels×17 pixels) is read from each frame buffer, which can correspondingly shorten a time period required for memory access Therefore, the operation speed of the video decoder can be increased without making the operation frequency of each frame buffer higher or expanding the input/output data bus width.

According to another aspect of the present invention, a video decoder, decoding a video stream using a discrete cosine transform together with a motion compensated prediction performing a backward prediction and a forward prediction, includes a first frame buffer provided with a storage area for forward-reference luminance data used in the backward prediction and a storage area for rearward-reference color-difference data used in the forward prediction; a second frame buffer provided with a storage area for forward-reference color-difference data used in the forward prediction and a storage area for rearward-reference luminance data used in the forward prediction; and a read control circuit performing memory accesses for the first frame buffer and the second frame buffer in a parallel processing, to read the forward-reference luminance data from the first frame buffer while reading the forward-reference color-difference data from the second frame buffer, and also to read the rearward-reference color-difference from the first frame buffer while reading the rearward-reference luminance data from the second frame buffer.

Therefore, according to the present invention, extremely effective shortening of the time period required for the memory access can be attained.

More preferably, the video decoder includes a write control circuit for storing the forward-reference luminance data and the rearward-reference color-difference data into a predetermined storage area in the first frame buffer, and also for storing the forward-reference color-difference data and the rearward-reference luminance data into a predetermined storage area in the second frame buffer.

More preferably, in the video decoder, each of the first and second frame buffers includes an SDRAM with the same input/output data bus width.

Therefore, according to the present invention, memory accesses for the first frame buffer and the second frame buffer are performed in a parallel processing. Thus, the time period required for the memory access upon reading of the luminance data and the color difference data of one Macroblock from each frame buffer can be shortened for a time period required for two command overheads defined by a buffer memory such as the SDRAM. Thus, the operation speed of the video decoder can further be increased.

BRIEF DESCRIPTION OF DRAWINGS

FIGS. 7A–7C are schematic diagrams illustrating an operation of a conventional MPEG video decoder.

BEST MODE FOR CARRYING OUT THE INVENTION

Embodiments of the present invention will be described below with reference to the drawings.

It should be noted that, in the embodiments, same components as the ones in the conventional MPEG video decoder shown in FIGS. 4–7C are denoted by the same reference characters, and the description thereof will not be repeated.

Figure 1:
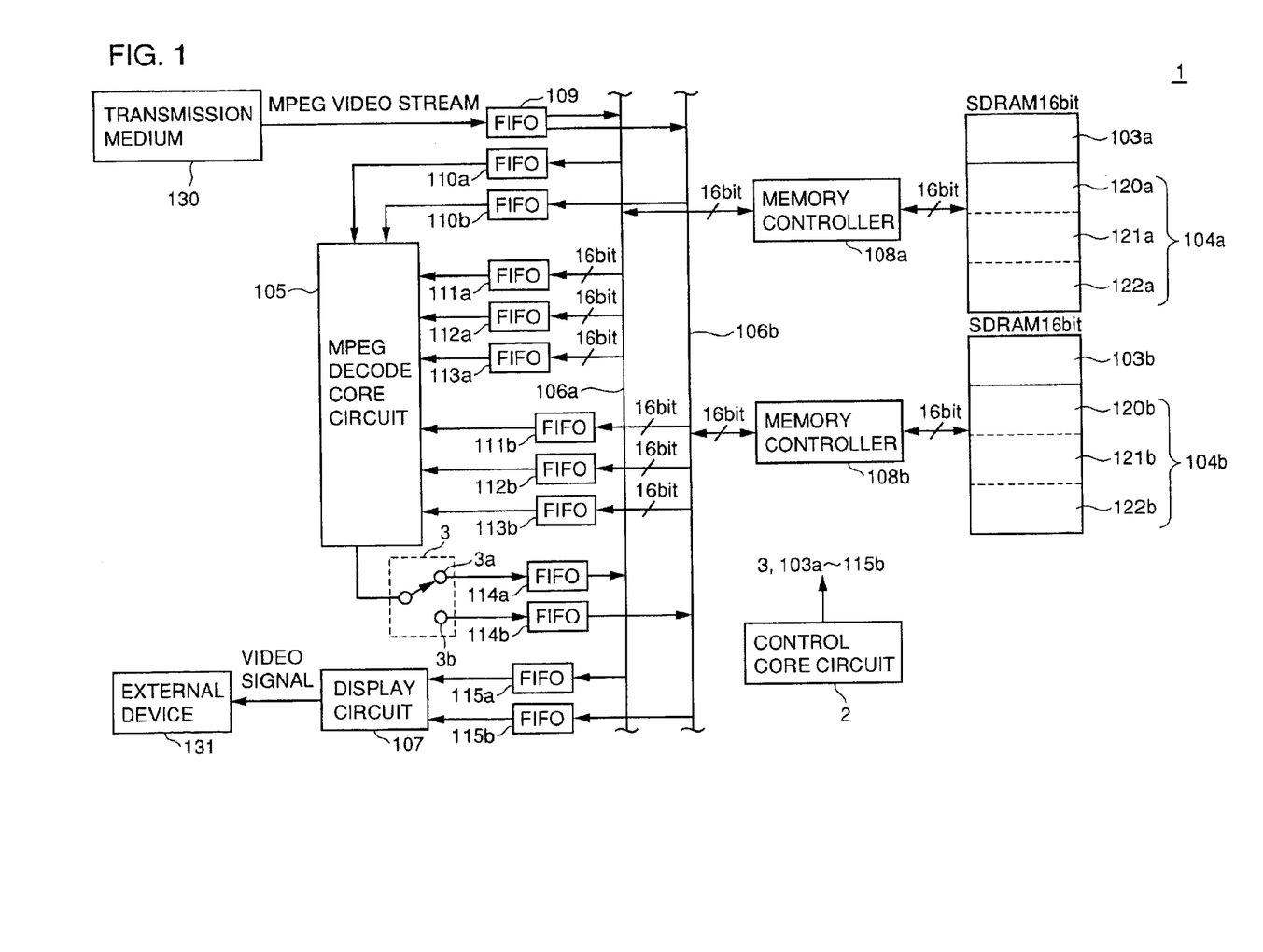
FIG. 1 is a block circuit diagram of an MPEG video decoder according to the first embodiment of the present invention.

FIG. 1 is a block circuit diagram showing a configuration of an MPEG video decoder 1 of the first embodiment.

MPEG video decoder 1 includes a control core circuit 2, a switch circuit 3, bit buffers 103a and 103b, frame buffers 104a and 104b, an MPEG decode core circuit 105, data buses 106a and 106b, a display circuit 107, memory controllers 108a and 108b, and buffers with FIFO configurations 109, 110a–115b. Circuits 2 and 103a–115b constituting MPEG decoder 1 are mounted on one LSI chip.

Control core circuit 2 controls circuits 3 and 103a–115b.

A video stream transferred from a transmission medium 130 is initially input into buffer 109, and transferred therefrom through each of data buses 106a, 106b and each of memory controllers 108a, 108b, and to each of bit buffers 103a, 103b, and is written in each of bit buffers 103a, 103b.

Each of bit buffers 103a, 103b is constituted of a ring buffer including an SDRAM with the FIFO configuration, and successively stores video streams transferred from transmission medium 130.

Bit buffers 130a, 130b are provided for the same reason as why bit buffer 103 is provided in conventional MPEG video decoder 101.

Each of frame buffers 104a, 104b includes the SDRAM, and its inside is divided into three regions (forward reference areas 120a, 120b; rearward reference areas 121a, 121b; and B-Picture storage areas 122a, 122b).

To reduce the number and cost of components in MPEG video decoder 1, bit buffer 103a and frame buffer 104a are provided in different regions of one SDRAM, and bit buffer 103b and frame buffer 104b are provided in different regions of one SDRAM.

Input/output data bus width (bit width) of SDRAMs in which bit buffers 103a, 103b and frame buffers 104a, 104b are respectively provided is set to 16 bit. Correspondingly, input/output data bus width of each of memory controllers 108a, 108b and data bus width of each of data buses 106a, 106b are also set to 16 bit.

Memory controller 108a controls reading and writing operations of bit buffer 103a and frame buffer 104a. Memory controller 108b also controls reading and writing operations of bit buffer 103b and frame buffer 104b.

The video stream stored in each of bit buffers 103a and 103b is read for one Picture per one frame period by each of memory controllers 108a and 108b. The video stream for one Picture read from bit buffer 103a is transferred from memory controller 108a through data bus 106a and buffer 110a in this order, and is input to MPEG decode core circuit 105. Further, the video stream for one Picture read from bit buffer 103b is transferred from memory controller 108b through data bus 106b and buffer 110b in this order, and is input to MPEG decode core circuit 105.

MPEG decode core circuit 105, as in the case with conventional MPEG video decoder 101, successively performs a variable length decoding process, a dequantization process, an IDCT process and an MC process, for the input video stream of one Picture.

The result of the MC process by MPEG decode core circuit 105 is transferred to switch circuit 3. Switch circuit 3 is switched to either side of each node 3a, 3b. When switch circuit 3 is switched to a node 3a side, the result of the MC process is transferred through buffer 114a, data bus 106a, memory controller 108a and to frame buffer 104a in this order, and is stored in any one of the areas 120a–122a of frame buffer 104a by memory controller 108a. When switch circuit 3 is otherwise switched to a node 3b side, the result of the MC process is transferred from buffer 114b, data bus 106b, memory controller 108b and frame buffer 104b in this order, and is stored in any one of the areas 120b–122b of frame buffer 104b by memory controller 108b.

The data read from each area 120a–122a of frame buffer 104a by memory controller 108a is transferred from memory controller 108a through data bus 106a and any one of buffers 111a–113a in this order, and is input to MPEG decode core circuit 105. Here, the data read from forward reference area 120a is transferred via buffer 111a, the data read from rearward reference area 121a is transferred via buffer 112a, and the data read from B-Picture storage area 122a is transferred via buffer 113a.

Further, the data read from each of the areas 120b–122b of frame buffer 104b is transferred from memory controller 108b through data bus 106b and any of buffers 111b–113b in this order, and is input to MPEG decode core circuit 105. Here, the data read from forward reference area 120b is transferred via buffer 111b, the data read from rearward reference area 121b is transferred via buffer 112b, and the data read from B-Picture storage area 122b is transferred via buffer 113b.

A future I-Picture or P-Picture, used upon the backward prediction in the MC process by MPEG decode core circuit 105, is stored in each of forward reference areas 120a and 120b. A past I-Picture or P-Picture, used upon the forward prediction in the MC process, is stored in each of rearward reference areas 121a and 121b. A B-Picture is stored in each of B-Picture storage areas 122a and 122b.

The I-Picture or P-Picture stored in each of forward reference areas 120a, 120b and in each of rearward reference areas 121a, 121b is used as base data for performing the forward prediction or the backward prediction, and hence it must be kept stored in each of areas 120a, 120b, 121a and 121b until it is no longer necessary. The B-Picture stored in B-picture storage regions 122a, 122b are not used as base data, so that the B-picture will be unnecessary once it is output to the outside of MPEG video decoder 1. It is noted that each of areas 120a–122b is also referred to as a plane.

Then, the Picture data read from any one of the areas 120a–122a of frame buffer 104a by memory controller 108a is transferred from memory controller 108a through data bus 106a and buffer 115a in this order, and is input to display circuit 107.

Further, the Picture data read from any one of the areas 120b–122b by memory controller 108b is transferred from memory controller 108b through data bus 106b and buffer 115b in this order, and is input to display circuit 107.

Display circuit 107 generates a video signal (an image signal) from the Picture data transferred from each of buffers 115a, 115b, and outputs the video signal to an external device 131 connected to MPEG video decoder 1.

MPEG video decoder 1 configured as described above is incorporated, as in the case with conventional MPEG video decoder 101, into a movie camera, a still camera, a television, a video CD reproducing device and a DVD reproducing device. When MPEG video decoder 1 is incorporated into a movie camera or a still camera, transmission medium 130 is replaced with an image pick-up device, such as a CCD, and its signal processing circuit.

Figure 2:
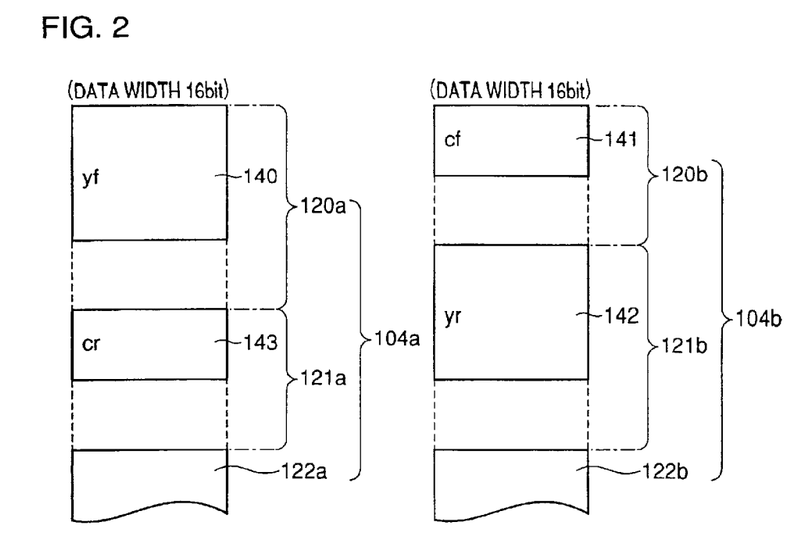
FIG. 2 is a first schematic diagram illustrating an operation of the first embodiment.

FIG. 2 schematically shows a storage state of luminance (Y) data and color difference (C) data stored in forward reference areas 120a, 120b and rearward reference areas 121a, 121b of respective frame buffers 104a, 104b including SDRAMs.

In frame buffer 104a, a storage area 140 for forward-reference luminance data yf is provided in forward reference area 120a, whereas a storage area 143 for rearward-reference color-difference data cr is provided in rearward reference area 121a.

In frame buffer 104b, a storage area 141 for forward-reference color-difference data cf is provided in forward reference area 120b, whereas a storage area 142 for rearward-reference luminance data yr is provided in rearward reference area 121b.

As described above, data size of color difference data is approximately half the data size of luminance data, and hence data size of each of storage areas 141, 143 are set to approximately half the data size of each of storage areas 140, 142.

Thus, storing of each data yf, cr, cf and yr into respective areas 120a, 121a, 120b and 121b of frame buffers 104a and 104b can be more easily and securely performed by switching operation of the switch circuit 3.

It is noted that provision of storage regions 140–143 for respectively storing data yf, cf, yr and cr in areas 120a, 121a, 120b and 121b of frame buffers 104a, 104b are referred to as memory mapping.

Figure 3:
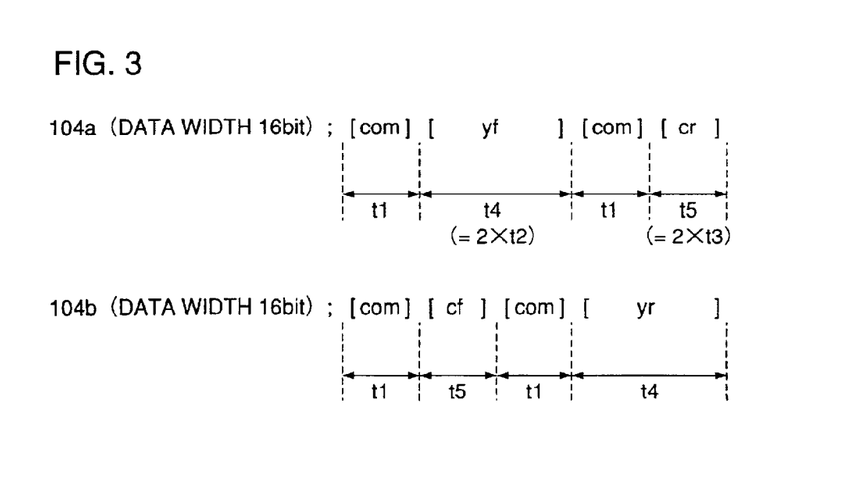
FIG. 3 is a second schematic diagram illustrating an operation of the first embodiment.

FIG. 3 schematically shows an order of memory access in a case where data of one Macroblock is read from each of areas 120a, 121a, 120b, 121b of frame buffers 104a, 104b including SDRAMs with the input/output data bus width of 16 bit.

The memory access for frame buffer 104a is performed in the following order: command overhead com for storage area 140; reading of forward-reference luminance data yf from storage area 140; command overhead com for storage area 143; and reading of rearward-reference color-difference data cr from storage area 143.

The memory access for frame buffer 104b is performed in the following order: command overhead com for storage area 141; reading of forward-reference color-difference data cf from storage area 141; command overhead com for storage area 142; and reading of rearward-reference luminance data yf from storage area 142.

Thus, forward-reference luminance data yf read from storage area 140 is transferred, while forward-reference color-difference data cf read from storage area 141 is transferred to MPEG decode core circuit 105. Thus, as in the case with conventional MPEG video decoder 101, MPEG decode core circuit 105 performs the backward prediction by the MC process, based on forward-reference luminance data yf and forward-reference color-difference data cf.

Further, rearward-reference color-difference data cf read from storage area 143 is transferred, while rearward-reference luminance data yr read from storage area 142 is transferred to MPEG decode core circuit 105. Thus, as in the case with conventional MPEG video decoder 101, MPEG decode core circuit 105 performs the forward prediction by the MC process, based on rearward-reference color-difference data cr and rearward-reference luminance data yr.

Frame buffers 104a and 104b; memory controllers 108a and 108b; and buffers 111a, 112a and buffers 111b, 112b respectively operate at the same time, and thus memory accesses for frame buffers 104a, 104b are performed in the parallel processing.

Therefore, time period T2 required for the memory access in such a case can be obtained by the equation (2) below.

$$T2 = 2 \times t1 + t4 + t5 \qquad (2),\text{ wherein}$$

t1 is a time period required for command overhead com, t4 is a time period required for reading of luminance data yf, yr, and t5 is a time period required for reading of color difference data cf, cr.

Here, the data bus width of each of flame buffers 104a, 104b is 16 bit. By contrast, the data bus width of frame buffer 104 in conventional MPEG video decoder 101 is 32 bit. Thus, relation between the time t1, t3, t4 and t5 is shown in equation (3) below.

$$t4=2\times t2$$

$$t5=2\times t3 \qquad (3)$$

As a result, relation between time T1 required for the memory access for conventional MPEG video decoder 101 obtained by the earlier equation (1) and time T2 required for the memory access for MPEG video decoder 1 of the present invention is shown in equation (4) below.

$$T2=T1-2\times t1 \qquad (4)$$

Therefore, according to MPEG video decoder 1 of the present invention, the time period required for the memory access upon reading the luminance data and the color difference data of one Macroblock from frame buffers 104a, 104b can be made shorter for a time period required for two command overheads com (=2×t1), compared to conventional MPEG video decoder 101.

Figure 7C:
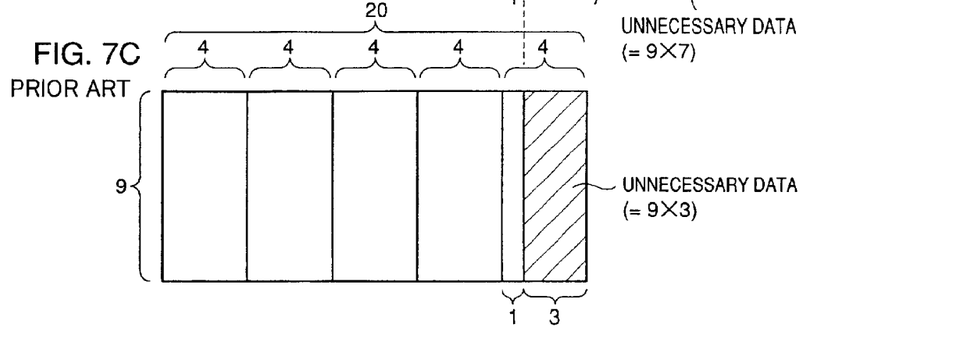
FIG. 7C shows an operation of reading luminance data of the half-Macroblock from the frame buffer.

As shown in FIG. 7C, it is only necessary to read data of 9 pixels×20 pixels in order to read the luminance data of half-Macroblock (data of 9 pixels×17 pixels) from each of frame buffers 104a, 104b including SDRAM with the input/output data bus of 16 bit. The minimum unit for accessing the SDRAM with the input/output data bus width of 16 bit is horizontal 4 pixels, and thus it is only necessary to read the data of 20 pixels, i.e., five times the horizontal 4 pixels, in order to read the data of horizontal 17 pixels. Then, if necessary data of 9 pixels×17 pixels is subtracted from the read data of 9 pixels×20 pixels, the remaining data of 9 pixels×3 pixels will be unnecessary.

As described above, in conventional MPEG video decoder 101, 9 pixels×24 pixels of data must be read, and thus data of 9 pixels×7 pixels will be unnecessary after subtracting necessary data of 9 pixels×17 pixels.

Therefore, according to MPEG video decoder 1 of the present invention, compared to conventional MPEG video decoder 101, it will be unnecessary to read an amount of useless 9 pixels×4 pixels of data upon reading the luminance data of half-Macroblock from frame buffers 104a and 104b, shorting the time required for the memory access for that amount.

As has been described, according to MPEG video decoder 1 of the present invention, the time period required for memory access upon reading data from frame buffers 104a, 104b can be shortened, compared to conventional MPEG video decoder 101, when the MC process is performed in MPEG decode core circuit 105.

Therefore, according to the present invention, the operation speed of MPEG video decoder 1 can be increased without further making the operation frequency of frame buffers 104a, 104b higher or expanding the input/output data bus width. It should be noted that the operation speed of MPEG video decoder 1 of the present invention is 1.3–1.5 times faster than that of conventional MPEG video decoder 101.

Thus, MPEG video decoder 1 with increased operation speed can be realized, without expensive and power-consuming frame buffers 104a, 104b with high operation frequency, resulting in that the increase of cost and power consumption can be avoided upon increase of the operation speed of MPEG video decoder 1.

In the present invention, data bus width (bit width) of SDRAM constituting frame buffers 104a and 104b, memory controllers 108a and 108b, and data buses 106a and 106b are all set to 16 bit, and thus the total of 32 bit, i.e., 16 bit+16 bit can be attained. When a process with even higher speed is required, 64 bit will be required, which can be attained by setting all the data bus width of SDRAM constituting frame buffers 104a and 104b, memory controllers 108a and 108b, and data buses 106a and 106b to 32 bit, so that the total of 64 bit, i.e., 32 bit+32 bit can be attained, which will have an effect similar to that of the present invention.

It should be noted that the present invention is not limited to the embodiments described above, and modifications can be made as described below to attain an operation effect equal to or better than the embodiments described above.

(1) In MPEG video decoder 1, buffers 113a, 113b may be appropriately dispensed with. Further, buffers 111a and 112a may be functionally replaced by one buffer, and buffers 111b and 112b may also be functionally replaced by one buffer.

(2) Each of frame buffers 104a, 104b can include, instead of SDRAM, a rewritable semiconductor memory in another form (e.g., DRAM, Rambus DRAM or the like).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video decoder decoding a video stream using a motion compensated prediction performing a backward prediction and a forward prediction, comprising:

a first frame buffer provided with a storage area for forward-reference luminance data used for said backward prediction and a storage area for rearward-reference color-difference data used for said forward prediction;

a second frame buffer provided with a storage area for forward-reference color-difference data used for said backward prediction and a storage area for rearward-reference luminance data used for said forward prediction; and a control circuit for controlling an operation of said video decoder;

said control circuit performing at least a part of a memory access operation for said first frame buffer and a memory access operation for said second frame buffer in a parallel processing.

2. The video decoder according to claim 1, further comprising:

a discrete cosine transform processing circuit for processing inverse discrete cosine transform for decoding data read from said first and second frame buffers.

3. The video decoder according to claim 1, wherein said control circuit stores, in a writing operation, forward-reference luminance data and rearward-reference color-difference data into a predetermined storage area in said first frame buffer, and also stores forward-reference color-difference data and rearward-reference luminance data into a predetermined storage area in said second frame buffer.

4. The video decoder according to claim 3, wherein said first and second frame buffers respectively include first and second memory circuits in which data output starts a predetermined time period after a read command is applied.

5. The video decoder according to claim 4, wherein each of said first and second memory circuits includes a synchronous dynamic random access memory with a same input/output data bus width.

6. The video decoder according to claim 4, wherein said video stream is an MPEG video stream using a discrete cosine transform together with a motion compensated prediction performing backward and forward predictions.

7. The video decoder according to claim 1, wherein said control circuit performs, in a reading operation, memory accesses for said first frame buffer and said second frame buffer in a parallel processing, and controls the reading operation such that i) forward-reference luminance data is read from said first frame buffer while forward-reference color-difference data is read from said second frame buffer, and ii) rearward-reference color-difference data is read from said first frame buffer while rearward-reference luminance data is read from said second frame buffer.

8. The video decoder according to claim 7, wherein said control circuit stores, in a writing operation, forward-reference luminance data and rearward-reference color-difference data into a predetermined storage area in said first frame buffer, and also stores forward-reference color-difference data and rearward-reference luminance data into a predetermined storage area in said second frame buffer.

9. The video decoder according to claim 8, wherein said first and second frame buffers respectively include first and second memory circuits in which data output starts a predetermined time period after a read command is applied.

10. The video decoder according to claim 9, wherein each of said first and second memory circuits includes a synchronous dynamic random access memory with a same input/output data bus width.

11. The video decoder according to claim 9, wherein said video stream is an MPEG video stream using a discrete cosine transform together with a motion compensated prediction for backward and forward predictions.

* * * * *